(12) United States Patent
Singh et al.

(10) Patent No.: US 8,804,566 B1
(45) Date of Patent: Aug. 12, 2014

(54) TRACKING AREA RECONFIGURATION BASED ON SECTOR LOAD

(75) Inventors: Jasinder P. Singh, Olathe, KS (US); Sachin R. Vargantwar, Overland Park, KS (US); Maulik K. Shah, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 122 days.

(21) Appl. No.: 13/558,054

(22) Filed: Jul. 25, 2012

(51) Int. Cl.
*G01R 31/08* (2006.01)

(52) U.S. Cl.
USPC ............ 370/252; 370/328; 370/229; 370/390

(58) Field of Classification Search
None
See application file for complete search history.

(56) References Cited

U.S. PATENT DOCUMENTS

| | | | |
|---|---|---|---|
| 5,289,527 A | 2/1994 | Tiedemann | |
| 5,754,959 A | 5/1998 | Ueno | |
| 5,875,400 A | 2/1999 | Madhavapeddy | |
| 5,889,494 A | 3/1999 | Reudink | |
| 5,969,689 A | 10/1999 | Martek | |
| 6,006,098 A | 12/1999 | Rathnasabapathy | |
| 6,246,674 B1 | 6/2001 | Feuerstein | |
| 6,282,429 B1 | 8/2001 | Baiyor | |
| 6,347,234 B1 | 2/2002 | Scherzer | |
| 6,434,380 B1 | 8/2002 | Andersson | |
| 7,260,396 B2 * | 8/2007 | Balachandran et al. | ... 455/435.1 |
| 8,385,938 B2 * | 2/2013 | Karlsson | ........................ 455/453 |
| 8,594,014 B2 * | 11/2013 | Kamalaraj et al. | ............ 370/328 |
| 2004/0198396 A1 | 10/2004 | Fransioli | |
| 2007/0242606 A1 * | 10/2007 | Chen | ............................. 370/235 |
| 2010/0281151 A1 | 11/2010 | Ramankutty | |
| 2010/0285816 A1 | 11/2010 | Vos | |
| 2011/0199905 A1 * | 8/2011 | Pinheiro et al. | ................ 370/235 |
| 2011/0261715 A1 * | 10/2011 | Norefors et al. | .............. 370/252 |
| 2012/0028647 A1 * | 2/2012 | Casati et al. | ................ 455/452.1 |
| 2013/0157671 A1 * | 6/2013 | Zhou et al. | ..................... 455/450 |
| 2013/0157710 A1 * | 6/2013 | Nammi et al. | ................. 455/525 |
| 2013/0232151 A1 * | 9/2013 | Shao | .............................. 707/741 |

OTHER PUBLICATIONS

Guang Wan et al, Department of Computer Science and Engineering Southern Methodist University, "A Dynamic Paging Scheme for Wireless Communication Systems."

* cited by examiner

*Primary Examiner* — Duc C Ho (57) ABSTRACT

A method and corresponding system is provided to help mitigate sector congestion. In one embodiment of the method, a RAN entity evaluates load among sectors of a tracking area and determines that the load is at least a threshold level of load. In response, the RAN entity enlarges the tracking area. In another embodiment of the method, when the RAN entity makes a decision to reconfigure a tracking area, it may consider one or more factors when determining how to reconfigure. In one example, the RAN entity may identify a particular border sector that has at least a threshold level of load or is a border sector in another network. Responsively, the RAN may reconfigure the tracking area such that the identified border sector is no longer a border sector. Other examples are possible.

20 Claims, 10 Drawing Sheets

FIG. 10 though these overhead messages and may register with the network by, for example, transmitting to the RAN a "tracking area update"

TRACKING AREA RECONFIGURATION BASED ON SECTOR LOAD

BACKGROUND

In typical cellular wireless communication systems, wireless communication devices (e.g., cell phones, personal digital assistants, laptops, netbooks, tablets, and/or other wirelessly equipped devices, any of which may be referred to as a user equipment (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Through each base station (and corresponding RAN), a UE can obtain connectivity to other networks such as the public switched telephone network (PTSN) and the Internet. Further, each RAN may include one or more radio network controllers (RNCs), or the like, which may be integrated with or otherwise in communication with the base stations, and which may include or be in communication with a switch or gateway that provides connectivity with one or more transport networks. Conveniently with this arrangement, a UE that is positioned within coverage of the RAN may communicate with a base station and in turn, via the base station, with other served devices or with other entities on the transport network.

Generally, wireless communications between a given UE and a serving base station in a RAN are carried out in accordance with one or more air interface protocols that define a mechanism for wireless exchange of information between the UE and the base station. Typically, an air interface protocol will define a "forward link" encompassing communications from the base station to the UE and a "reverse link" encompassing communications from the UE to the base station. Further, each of these links may be structured to define particular channels on which certain types of data may be transmitted. These channels may be defined through the use of various mechanisms, including for example, time division multiplexing, code division multiplexing (e.g., spread-spectrum modulation), frequency division multiplexing, as well as others.

The forward link, for example, may define (i) a pilot channel on which the RAN may broadcast a pilot signal to allow UEs to detect wireless coverage, (ii) system parameter channels (e.g., an overhead channel) on which the RAN may broadcast system operational parameters for reference by UEs so that the UE can then seek network access, (iii) paging channels on which the RAN may broadcast page messages to alert UEs of incoming communications, and (iv) traffic channels on which the RAN may transmit bearer traffic (e.g., application data) for receipt by UEs. And the reverse link, for example, may define (i) control channels on which UEs may transmit registration messages and call origination requests, and (ii) traffic channels on which UEs may transmit bearer traffic for receipt by the RAN.

In operation, when a RAN seeks to communicate with a UE (e.g., to establish an incoming voice call or transmit incoming packet data), the RAN may first page the UE on a paging channel. The purpose of paging the UE may be to determine whether the UE is still within range of a wireless coverage area, and if so, to notify the UE of the incoming communication, and perhaps assign a traffic channel to the UE. To carry out a page, the RAN may transmit to the base station that is currently serving the UE some indication of the reason for the page (e.g., that there is an incoming call or data packet directed to the UE). In turn, the serving base station may use this indication to generate a page record, which the base station may transmit to the UE in one way or another. The UE may then reply to the base station with a page-response message (PRM), or some other message indicating successful receipt of the page record.

Given the scarcity of paging channel resources, some wireless communication networks implement a "zone-based" paging scheme. In such a scheme, the coverage areas, or sectors, of the RAN are arranged into tracking areas, each with a respective tracking area ID. To facilitate paging on a zone basis, each base station in the RAN may broadcast in its respective sectors as one of the overhead parameters the tracking area ID for the tracking area in which the sector is located. A UE operating in the network may then programmatically monitor the tracking area IDs specified in the overhead messages and may register with the network by, for example, transmitting to the RAN a "tracking area update" message when the UE detects that it has moved into a new tracking area (or for other reasons).

A RAN entity that facilitates paging (such as a switch), may collect and store (in a database, for example) these tracking area update messages as a way to keep track of the tracking areas in which the UEs are located. When a switch or other RAN component seeks to page a certain UE, the switch or other component may then refer to the database and send the page message to just those base stations that are within the tracking area of the UE's most recent registration.

Overview

As mentioned above, each base station in a RAN radiates to define one or more wireless coverage sectors in which UEs may receive wireless service from that base station. In accordance with an example zone-based paging scheme, these sectors are grouped into several tracking areas, each of which may be assigned to one or more RAN devices referred to as mobility management entities (MMEs) to facilitate the paging of UEs. For instance, an MME managing the paging process for several tracking areas may receive tracking area update messages from subscriber UEs that move into a coverage of the tracking areas. And the MME may transmit to the base stations of a given tracking area page messages destined for UEs operating in that tracking area.

Tracking areas of a RAN typically include two types of sectors: "border sectors," which refer to those sectors that border at least one sector of another tracking area, and "non-border sectors," which refer to those sectors that do not border any sectors of another tracking area. These border sectors tend to be rather congested, especially on the reverse-link, because UEs typically send tracking area update messages when they enter into the border sectors from another tracking area. In addition, certain factors may aggravate this congestion. For instance, if a certain border sector is located near a high traffic area, such as a sports stadium or a busy highway, that border sector may experience high congestion as a result of many UEs entering into the border sector and sending tracking area update messages.

Another aggravating factor may occur when two or more wireless service providers share network resources in a particular area. For instance, in accordance with a partnership or revenue-sharing agreement of some kind, a host wireless service provider may share with a partner wireless service provider certain network equipment (such as base stations) or other resources (such as forward/reverse link carrier frequencies). This way, UEs subscribing to service from the partner service provider may register for and receive service from the host service provider's network equipment (which, for instance, may be provided in more convenient locations than the partner service provider's equipment).

Although the host network and the partner network may share base stations and sectors of a certain area, if they each engage in a zone-based paging scheme, they typically maintain their own tracking areas. That is, the host provider may arrange the sectors into one or more tracking areas for use in its network and the partner provider may arrange the sectors into one or more tracking areas for use in its network. This may lead to a problematic situation in which each provider arranges its respective tracking areas such that a particular shared sector is a border sector in a host provider's tracking area and a border sector in a partner provider's tracking area. Given that channel congestion in border sectors tends to be high as a general matter, congestion in sectors that are border sectors in two different networks may be especially severe.

To address these situations, and perhaps others, disclosed herein is a first method, which is designed to help mitigate congestion among sectors of a tracking area. In accordance with the method, a RAN entity evaluates load among the sectors of a given tracking area and, based on the evaluation, may determine that the load in the given tracking area is at least a threshold level of load. In response to this determination, the RAN entity may increase the size of the given tracking area. Increasing the size of a tracking area may help reduce the load among sectors of that tracking area because it may result in a tracking area configuration in which UEs tend to not move into new tracking areas as frequently. As such, in the larger-sized tracking area, UEs may send fewer tracking area update messages. This, in turn, may reduce the reverse link traffic in the network and may result less overall interference for subscriber UEs. Other advantages of larger tracking areas exist as well.

The RAN entity may consider various measurements of loading when evaluating the load among the sectors of the given tracking area and determining that this load is at least a threshold level of load. For instance, in at least one embodiment of the method, the RAN entity may evaluate the aggregate reverse link control-channel occupancy and determine that it is at least a threshold level of reverse link control-channel occupancy. Additionally or alternatively, in at least one embodiment of the method, the RAN entity may evaluate the total number of tracking area update messages sent per some unit of time (e.g., one minute) by UEs operating in the given tracking area. A RAN entity may consider other measurements of sector load as well.

In some embodiments of the method, the RAN entity may increase the size of a given tracking area by, for example, joining the given tracking area to another tracking area, or alternatively, moving some sectors from another tracking area to the given tracking area. In one application of this, the RAN entity may instruct some base stations of another tracking area to change the tracking area IDs that they each broadcast to UEs to the tracking area ID of the given tracking area. Other examples are possible as well.

Also disclosed herein is a second method, which is designed to help mitigate congestion among sectors of a tracking area when a RAN entity reconfigures the tracking area. In one embodiment of this method, when a RAN entity makes a decision to reconfigure a given tracking area (e.g., as a result of evaluating load among sectors of the given tracking area and determining that the load is at least a threshold level of load, as described above, or perhaps for other reasons), the RAN entity may evaluate load at each border sector of the given tracking area, and determine that a particular border sector has at least a threshold level of load. In response to this determining, the RAN entity will reconfigure the given tracking area such that the particular border sector does not border any other tracking area. Doing so may help alleviate the load in that sector because it may reduce the number of tracking area update messages transmitted by UEs moving into that sector. In turn, this may reduce reverse link traffic in that sector and generally result in less interference for subscriber UEs operating in that sector. Other advantages may exist as well.

In another embodiment of this method, when a RAN entity makes a decision to reconfigure a given tracking area that includes sectors shared by a host network and a partner network, (e.g., where the decision to reconfigure the tracking area is a result of evaluating load among sectors of the given tracking area and determining that the load is at least a threshold level of load, as described above, or perhaps for other reasons), the RAN entity may identify a particular sector that is a border sector in the host network and is also a border sector in the partner network. In response to this identification, the RAN entity will reconfigure the given tracking area such that the particular sector does not border any tracking area of the host network. Doing so may help to alleviate the load in that sector because it may reduce the number of tracking area update messages transmitted by UEs subscribing to service from the host network. In turn, this may reduce the reverse link traffic in that sector and generally result in less interference in that sector for UEs subscribing to service from the host network and UEs subscribing to service from the partner network. Other advantages may exist as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another such non-transitory machine-readable medium.

Figure 1:
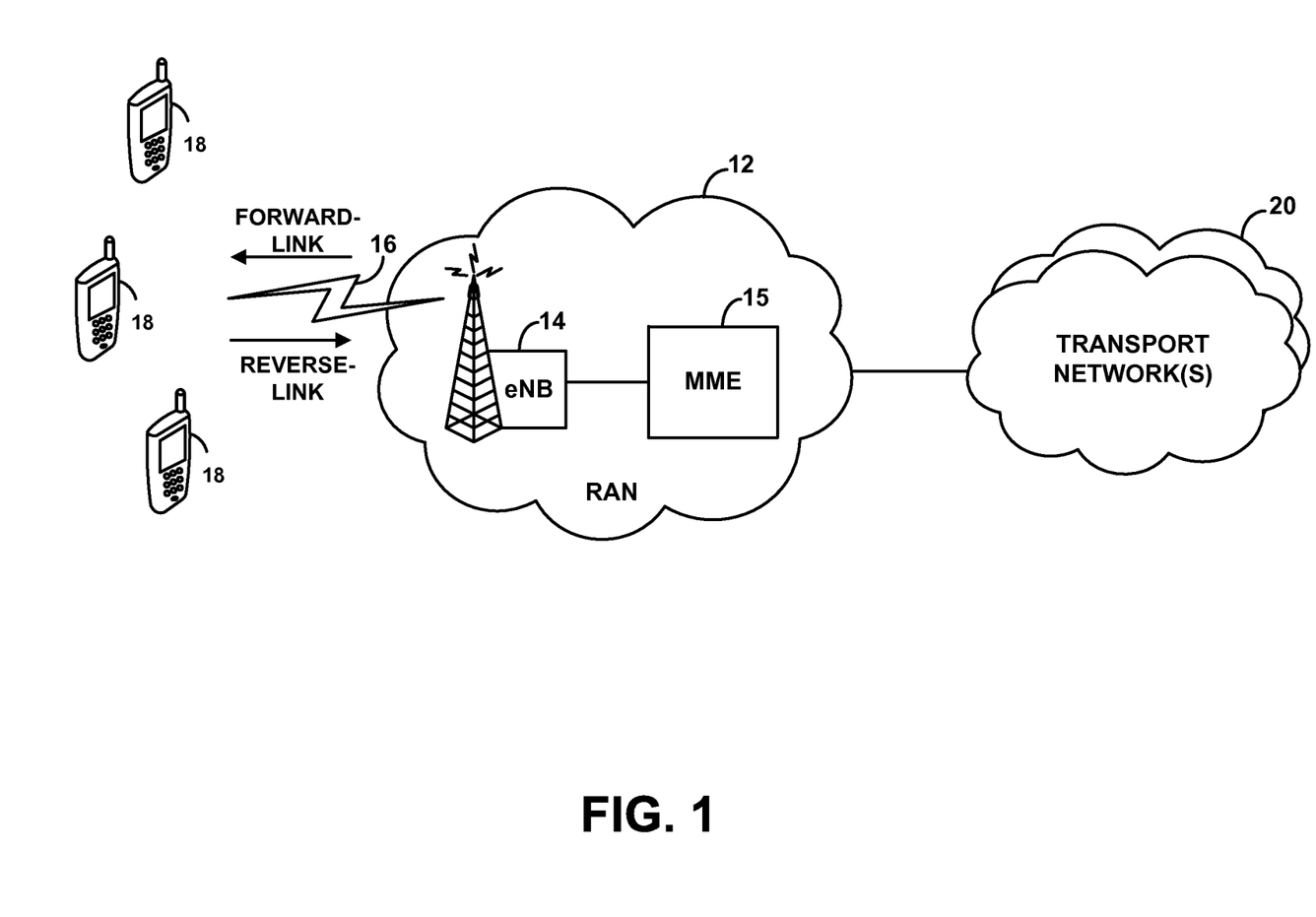
FIG. 1 depicts an example communication system, in which an example embodiment of the described arrangement can be implemented.

At a general level, as shown in FIG. 1, the example wireless communications system includes at its core a RAN 12 having a base station, such as eNodeB (eNB) 14, that radiates to define a wireless air interface 16 through which the eNB may communicate with at least one UE 18. The eNB 14 is in turn shown coupled to a Mobility Management Entity (MME) 16 that typically coordinates functionality between eNB 14 and other eNBs (not shown). RAN 12 then provides connectivity with one or more transport networks 20, such as the public switched telephone network (PSTN) or the Internet for instance. With this arrangement, a UE 18 that is positioned within coverage of the base station and that is suitably equipped may engage in air interface communication with the base station and may thereby communicate with remote entities on the transport network(s) 20 and/or with other UEs served by the RAN.

At a more complex level, but still by way of example, the network architecture of RAN 12 may be configured to communicate with UEs 18 over the air interface 16 according to one or more agreed air interface protocols, examples of which include Long Term Evolution (LTE) Code Division Multiple Access (CDMA), Universal Mobile Telecommunications System (UMTS), Wireless Interoperability for Microwave Access (WiMAX), IDEN, GSM, GPRS, EDGE, MMDS, WIFI, BLUETOOTH, and other protocols now known or later developed. For example, in a UMTS system configured to operate according to LTE standards, the base station is usually referred to as an eNodeB or an eNB and the entities that coordinate functionality between the several eNodeBs of the network are usually referred to as MMEs. In a CDMA system configured to operate according to the IS-2000 standard (sometimes referred to as 1xRTT) or the IS-856 standard (sometimes referred to as 1xEV-DO), the base station is usually referred to as a Base Transceiver Station (BTS) and is usually under the control of a Base Station Controller (BSC). Other architectures and operational configurations of a RAN are possible as well.

As further shown in FIG. 1, the air interface 16 generally defines a forward-link that carries wireless communications from the RAN 12 to the UEs 18 and a reverse-link that carries wireless communications from the UEs 18 to the RAN 12. Depending on the protocol, these links may be structured in various ways. At a high level, for instance, the eNB 14 may provide service on one or more frequency channels or bands, with forward-link communications occupying one band and reverse-link communications occupying another band. Alternatively, forward-link and reverse-link communications may be carried out on a common frequency band and may be differentiated through time division multiplexing and/or other techniques.

As mentioned above, the forward link, for example, may define various sub-channels including (i) a pilot channel, (ii) system parameter channels, (iii) paging channels, and (iv) traffic channels. And as also mentioned above, the reverse link, for example, may define various sub-channels including (i) access channels, and (ii) traffic channels.

2. Example Network Device

Figure 2:
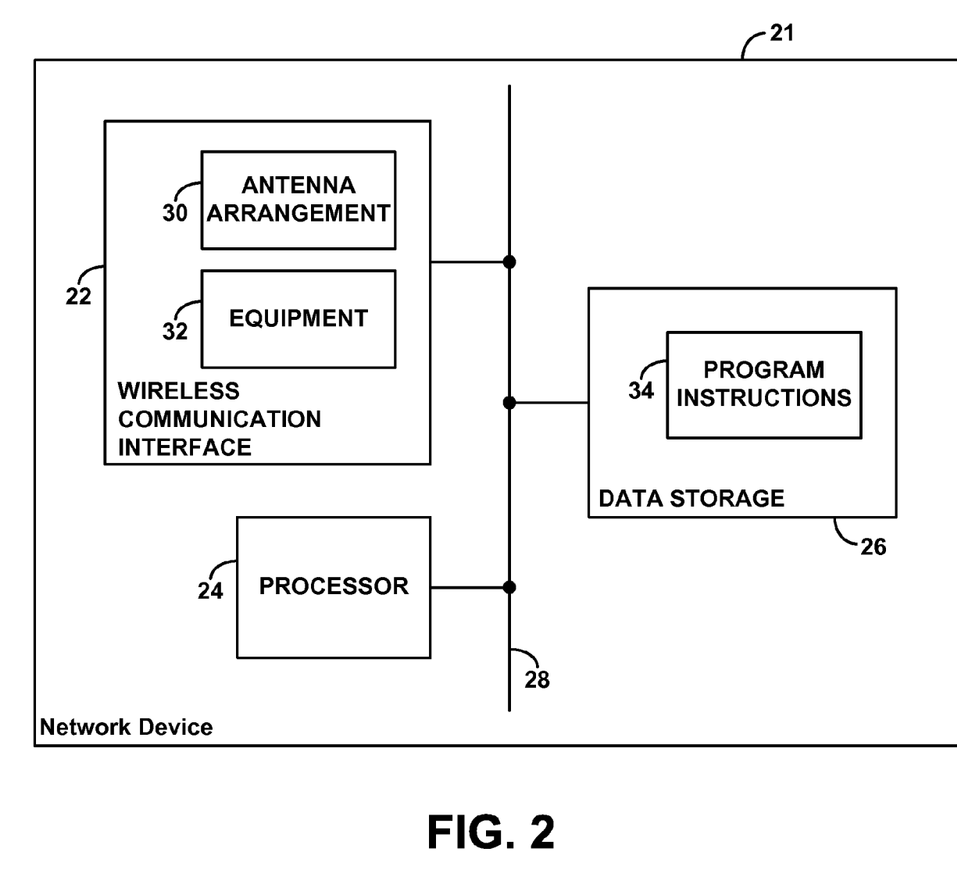
FIG. 2 depicts an example network device arranged to implement the present methods.

FIG. 2 is a simplified block diagram of an example network device 21 that may be configured to carry out network-side functions described herein. Network device 21 may be representative of eNB 14, MME 16, MME 16 integrated with eNB 14, or some other entity not shown but associated with RAN 12 or transport network(s) 20 in FIG. 1, for instance, such as a BTS, access node, access point, or a Node-B (whether macro, femto or the like). As shown in FIG. 2, the network device may include a wireless communication interface 22, a processor 24, and data storage 26, all of which may be coupled together by a system bus, network or other connection mechanism 28.

As further shown, wireless communication interface 22 may include an antenna arrangement 30 and associated equipment 32, the combination of which may enable network device 21 to communicate with UEs (or perhaps other network devices) on a network such as RAN 12. For example, wireless communication interface 22 may enable network device 21 to transmit forward-link communications to UEs, and receive reverse-link communication from UEs. Accordingly, the antenna arrangement 30 may be tower mounted and configured to radiate to define one or more wireless coverage sectors in which UE 18 operates. The equipment 32 may include a trunk, optical link, or any Ethernet network interface card or other physical connection that can be coupled with any other entity on the RAN 12 or transport network(s) 20. By way of example, the equipment 32 may include a module, such as an CSM™-series chipset made by Qualcomm Inc. of San Diego, Calif., and may support wireless packet-data communications according to a CDMA family of protocols. Other modules that support others communications protocols are possible as well.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components and may be integrated in whole or in part with processor 24.

As shown, data storage 26 may hold program instructions 34, which may be executable by processor 24 to carry out various base station or RAN 12 functions described herein. For instance, in accordance with the program instructions, the processor may function to evaluate aggregate load among sectors of a given tracking area and, based on this evaluation, may determine that the aggregate load is at least a threshold level of aggregate load. In response, the processor may function to increase the size of the given tracking area.

In accordance with additional program instructions, the processor may function to make a decision to reconfigure a given tracking area, evaluate load at each border sector of the given tracking area, and determine that a particular border sector has at least a threshold level of load. In response to this determining, the processor may function to reconfigure the given tracking area such that the particular border sector does not border any other tracking area.

And in accordance with additional program instructions, the processor may function to make a decision to reconfigure a given tracking area that includes sectors shared by a host network and a partner network, and identify a particular sector that is a border sector in the host network and is also a border sector in the partner network. In response to this identification, the processor may function to reconfigure the given tracking area such that the particular sector does not border any tracking area of the host network.

As such, the processor 24 programmed with instructions 34 may define part or all of a controller for controlling operation of the network device 21. Alternatively or additionally, however, such control functionality could be provided external to the network device 21, such as within some other entity not shown but associated with RAN 12 or transport network(s) 20 in FIG. 1. Such an entity may be communicatively linked with the network device 21 and could serve to control aspects of the network device 21 and RAN operation generally.

3. Example User Equipment

Figure 3:
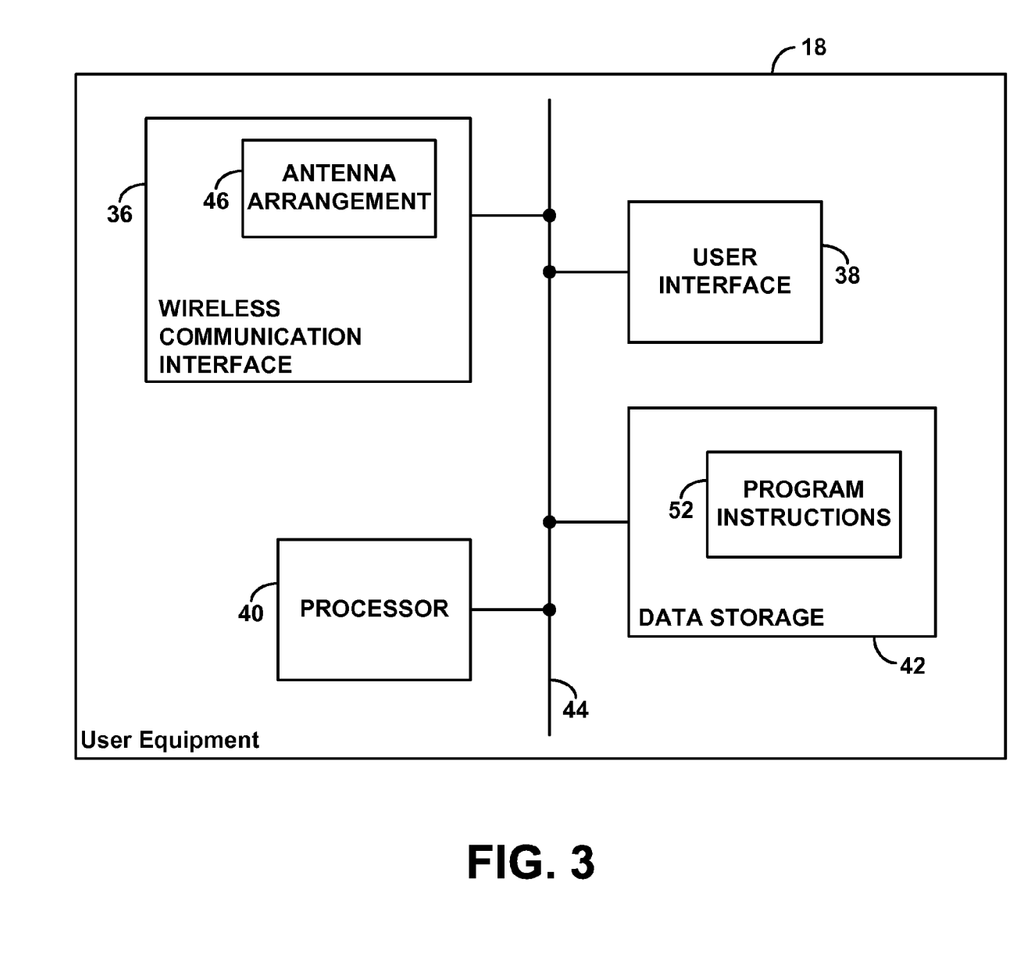
FIG. 3 depicts an example user equipment arranged to implement the present methods.

FIG. 3 is a simplified block diagram of a representative UE 18 (also possibly referred to as, a mobile station, access terminal, a wireless communication device, or the like), such as a cellular telephone, wirelessly equipped tablet or personal computer, embedded wireless communication module, for instance. As shown, the representative UE may include a wireless communication interface 36, a user interface 38, a processor 40, and data storage 42, all of which may be coupled together by a system bus, network, or other connection mechanism 44.

Wireless communication interface 36 may comprise an antenna arrangement 46 and associated components, for engaging in communication with serving base stations such as eNB 14, such as to transmit data and control information to the base stations and to receive data and control information from the base stations. For instance, the wireless communications interface 36 may include a mobile station modem, such as an MSM™-series chipset made by Qualcomm Inc. of San Diego, Calif. Wireless communication interface 36 may support one or more wireless packet-data communication protocols.

User interface 38 may then facilitate interaction with a user of the UE if applicable. As such, the user interface may include output components such as a display screen, loudspeaker, and headphone jack, and input components such as a keypad, a touch-sensitive screen, and a camera.

Processor 40 may then comprise one or more general purpose processors and/or special-purpose processors and may be integrated in whole or in part with wireless communication interface 36. And data storage 42 may comprise one or more volatile and/or non-volatile storage components and may be integrated in whole or in part with processor 40. As shown, data storage 42 may hold program instructions 52, which may be executable by processor 40 to carry out various UE functions described herein.

4. Example Tracking Areas Reconfigurations

Figure 4:
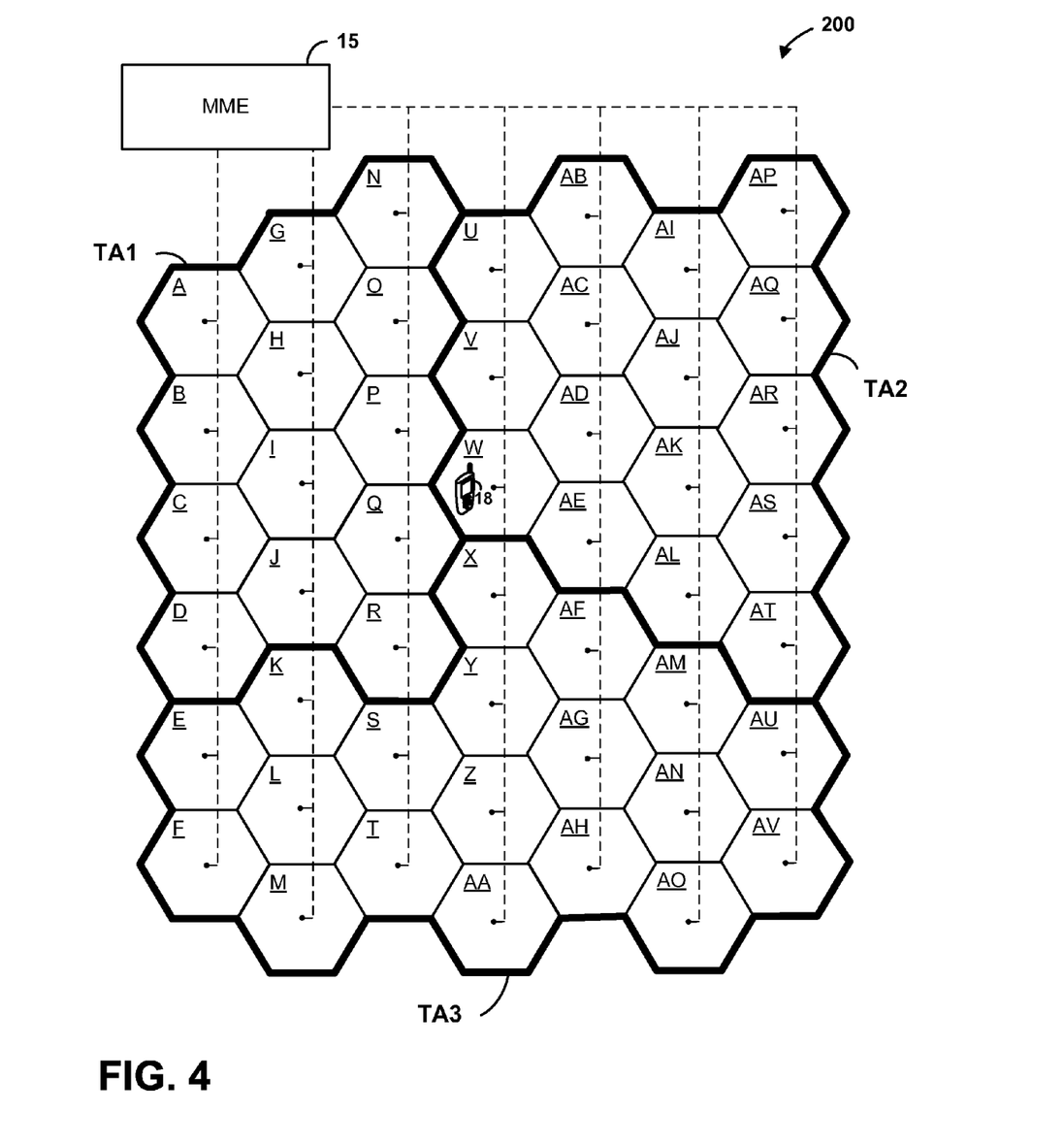
FIG. 4 depicts an example arrangement of tracking areas in which the present methods can be implemented.

FIG. 4 is a block diagram depicting a portion of an example wireless network 200. As shown in FIG. 4, network 200 includes forty-eight wireless coverage sectors A-AV, which are grouped into three different tracking areas TA1, TA2, and TA3 to facilitate the paging of subscriber UEs operating in network 200, such as UE 18. In particular, tracking area TA1 includes thirteen sectors, tracking area TA2 includes sixteen sectors, and TA3 includes nineteen sectors. In addition to these sectors, network 200 may include additional sectors (not shown) that may or may not be grouped into additional tracking areas. Each sector in network 200 is generally defined by radiation of a respective eNB's (or other base station's) antenna arrangement. For brevity, each sector A-AV is shown as being roughly hexagonal; however, in practice, wireless coverage sectors may be circular, oval, or any other shape.

As further shown, network 200 includes an MME 15 that generally manages the tracking and paging of UEs operating in network 200. To facilitate this, MME 15 may be communicatively coupled to each respective eNB or base station of the wireless coverage sectors A-AV as well as to a UE registration database (not shown), which may store location information that indicates the most recent tracking area of UEs operating in network 200. A UE registration database may store other information as well.

To further facilitate the tracking and paging of subscriber UEs, in each sector a respective eNB may broadcast over an air interface an identification of the tracking area in which the sector is included. In network 200, for example, eNBs of sectors A, B, C, D, G, H, I, J, N, 0, P, Q, and R may broadcast tracking area ID "TA1," eNBs of sectors U, V, W, AB, AC, AD, AE, AI, AJ, AK, AL, AP, AQ, AR, AS, and AT may broadcast tracking area ID "TA2," and eNBs of sectors E, F, K, L, M, S, T, X, Y, Z, AA, AF, AG, AH, AM, AN, AO, AU, and AV may broadcast tracking area ID "TA3." Accordingly, when, for example, UE 18 moves from a sector of tracking area TA1 into a sector of tracking area TA2, say sector W, UE 18 may detect the broadcast of tracking area ID "TA2" by an eNB of sector W. Consequently, UE 18 may inform MME 15 that UE 18 is within coverage of tracking area TA2 so that MME 15 knows where to transmit a page message destined for UE 18. In particular, UE 18 may transmit a tracking area update message to an eNB that radiates to define sector W, which in turn, may forward the tracking area update message to MME 15. In response, MME 15 may update a UE registration database with an indication that UE 18 is operating in tracking area TA2. Thus, in the event that MME 15 needs to page UE 18, MME 15 may refer to a UE registration database, determine that UE 18 is operating in tracking area TA2, and transmit the page message to the eNBs that radiate to define the sectors of tracking area TA2. To keep MME 15 apprised of the UE's location, UE 18 may then transmit a new tracking area update message when it moves into coverage of a new tracking area, e.g., sector X of TA3.

As mentioned above, border sectors of tracking areas tend to be rather congested, especially on the reverse link, as a result of UEs moving into those border sectors and transmitting tracking area update messages. This congestion may be especially severe if the border sectors are located near high-traffic areas, such as highways or sports stadiums. For instance, if there was a busy roadway that ran between sector W and sectors Q and P, UEs that travel on that roadway may frequently cross over the border between TA2 and TA1 (or vice versa). As described above, upon crossing the border into coverage of a new TA, the UEs may transmit tracking area update messages to inform MME 15 of the UEs' new location. The frequent transmission of tracking area update messages may congest the reverse-link control channel in the border sectors, which may result in increased interference for UEs operating in those border sectors and the tracking area in general.

In accordance with one method designed to help mitigate sector congestion, a RAN entity, such as MME 15, may evaluate the load among sectors of a particular tracking area, say TA1, and enlarge the particular tracking area in response to the load reaching at least a threshold level. As mentioned briefly above, as a general matter, it may be more preferable to arrange sectors into one or two larger tracking areas rather than several smaller tracking areas. For instance, UEs operating in a network arranged with larger tracking areas typically tend to send, on average, fewer tracking area update messages because they tend not to cross tracking area borders as often as they might in a network arranged with smaller tracking areas. Particularly, in accordance with the example situation described above, if TA1 was enlarged to encompass the busy roadway running between sector W and sectors P and Q, then UEs traveling on that roadway may not necessarily cross over into a new tracking area. Consequently, those UEs may not send any tracking area update messages, which reduces the total number of tracking area update messages sent in the network. Fewer tracking area update message transmissions by UEs in the network may reduce the overall reverse link traffic in the network. This, as a result, may reduce interference for the UEs, as well as perhaps have other advantages for the network.

Figure 5:
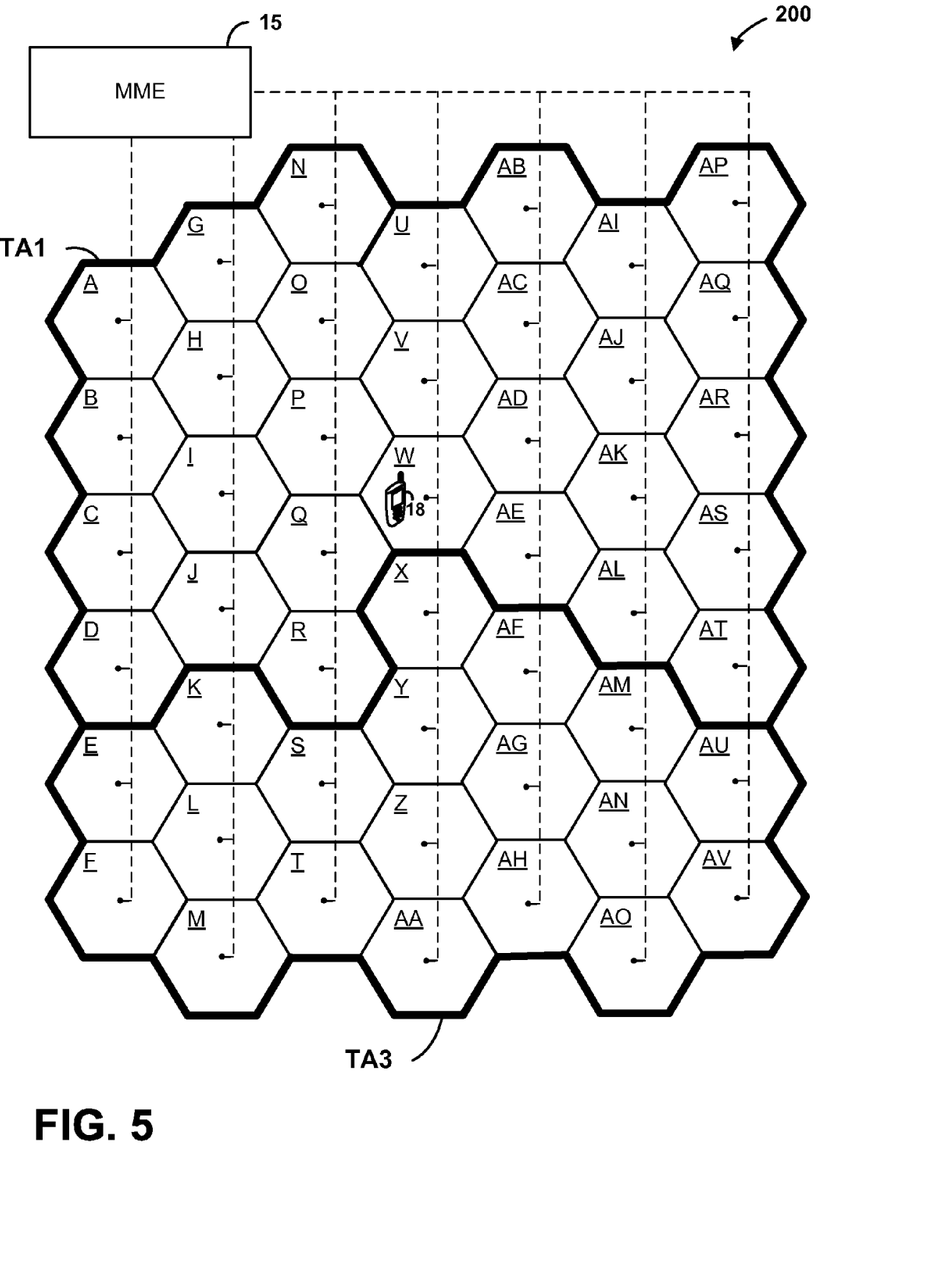
FIG. 5 depicts an example arrangement of tracking areas in which the present methods can be implemented.

FIG. 5 depicts a portion of network 200 after MME 15, or perhaps another RAN entity, enlarged TA1. In particular, in this arrangement, MME 15 joined tracking areas TA2 and TA1. However, in other embodiments of the method, MME 15 may enlarge TA1 in other ways, such as by moving some rather than all of the sectors of TA2 (or another tracking area) over to TA1. One way to change a sector's tracking area is for the MME 15 to instruct the sector's eNB to change the tracking area ID that it broadcasts in that sector. Such an instruction may come in the form of a message transmitted by the MME 15 to the eNB. In addition to instructing an eNB to change its tracking area ID broadcast, MME 15 may update one or more registration databases to indicate which sectors are a part of which tracking areas. Other ways of changing a sector's tracking area are possible as well, as are other ways of enlarging the size of a tracking area.

As depicted in FIG. 5, for example, in response to MME 15 evaluating the load among the sectors of TA1 and determining that the load has reached a threshold level, MME 15 may send a message to the respective eNBs of sectors U, V, W, AB, AC, AD, AE, AI, AJ, AK, AL, AP, AQ, AR, AS, and AT instructing them to change their broadcast tracking area IDs from "TA2" to "TA1." As a result of this change, UEs operating in coverage of these sectors, such as UE 18 operating in coverage of sector W, may detect that they were once operating in tracking area TA2 but are now operating in tracking area TA1. Programming logic in the UE may register this change in tracking areas, and consequently cause the UE to send a tracking area update message informing MME 15 of which tracking area the UE is now located.

In one embodiment of the method, a RAN entity, such as MME 15, may evaluate load among sectors of the given tracking area by measuring the total reverse link congestion (or just the reverse link congestion on a particular channel, e.g., the control channel) among the sectors of the given tracking area. For example, this may take the form of the RAN entity measuring how many UEs are currently communicating on the reverse-link compared with the total reverse-link capacity. When this measurement reaches a certain threshold, say 80%, the RAN entity may enlarge the tracking area. Alternatively, this may take the form of measuring the current reverse-link noise rise among sectors in the given tracking area. When this measurement reaches a certain threshold, say 8 dB, the RAN entity may enlarge the tracking area. Other measurements of reverse link congestion are possible as well.

In another embodiment of the method, a RAN entity, such as MME 15, may evaluate load among sectors of the given tracking area by measuring the number of tracking area update messages sent per unit time by UEs operating in the given tracking area. When this measurement reaches a certain threshold, say 1000 tracking area update messages sent per minute, the RAN entity may enlarge the tracking area. Other threshold rates of tracking area update messages sent per unit time are possible, as are other ways to measure load among sectors of a given tracking area.

In accordance with another method designed to help mitigate sector congestion, when a RAN entity, such as MME 15, makes a decision to reconfigure a given tracking area, the RAN entity may consider one or more factors when deciding how to reconfigure the given tracking area. In one embodiment of the method, for instance, the RAN entity may make a decision to reconfigure a tracking area, for one reason or another. Upon making such a decision, the RAN entity will evaluate load at each individual border sector of the given tracking area and may identify a border sector that has at least a threshold level of load. The RAN entity may then reconfigure the tracking area such that the identified border sector does not border any other tracking area. In other words, when the RAN entity reconfigures the tracking area, it will add or remove sectors in such a way so that the identified border sector is not a border sector in the new tracking area. This may help reduce congestion in that border sector, as well as, perhaps, have other advantages for the network.

Generally, the RAN entity may make a decision to reconfigure a tracking area for any reason. In one embodiment of the method, for instance, the RAN entity may make a decision to reconfigure a tracking area in response to evaluating the load among sectors of the tracking area and determining that the evaluated load is at least a threshold level of load. Other reasons for making a decision to reconfigure a tracking area possible as well.

In at least one embodiment of the method, the RAN entity may evaluate load at an individual border sector of the given tracking area by measuring the reverse link congestion (or just the reverse link congestion on a particular channel, e.g., the control channel) of the border sector. For example, as described above, this may take the form of the RAN entity measuring how many UEs are currently communicating on the reverse-link in that sector compared with the total reverse-link capacity of that sector. When reverse link congestion in a particular border sector reaches a certain threshold, say 80%, the RAN entity may reconfigure the tracking area such that the particular sector is no longer a border sector. Alternatively, this may take the form of measuring the current reverse-link noise rise at each individual border sector. When reverse noise rise in a particular border sector reaches a certain threshold, say 8 dB, the RAN entity may reconfigure the tracking area such that the particular sector is no longer a border sector. Other thresholds of load are possible as are other measurements of reverse link congestion.

In another embodiment of the method, a RAN entity may evaluate load at an individual border sector of the given tracking area by measuring the number of tracking area update messages sent per unit time by UEs operating in the particular border sector. When this measurement reaches a certain threshold, say 100 tracking area update messages sent per minute, the RAN entity may reconfigure the tracking area such that the particular sector is no longer a border sector. Other threshold rates of tracking area update messages sent per unit time are possible as are other ways to measure load at border sectors.

In still another embodiment of the method, the RAN entity may evaluate load at each border sector of the given tracking area (in accordance with any of the procedures described above) and, based on the evaluating, may identify from among the border sectors of the given tracking area a border sector that has the highest level of load. The RAN entity may then reconfigure the given tracking area such that the identified border sector is no longer a border sector. Other examples of reconfiguring tracking areas are possible as well.

As described above, a host service provider and a partner service provider may share one or more wireless coverage sectors in a particular area. That way, UEs that subscribe to service from the partner provider (as well as UEs that subscribe to service from the host provider) can register for and receive service from the host provider's equipment (which, by way of example, may be positioned in more convenient locations than the partner provider's equipment). However, one drawback to such an arrangement is that each provider typically maintains their own tracking area configurations. When each network arranges its tracking areas in such a way so that a particular shared sector is a border sector in each network, congestion may be particularly severe in that shared sector.

Thus, in yet another embodiment of the present method, to help alleviate this potential congestion, a first network (either the host provider's network or the partner provider's network, as the case may be), may make a decision to reconfigure a given tracking area. And upon making this decision, the first network may identify a particular border sector of the given tracking area that is also a border sector in a tracking area of a second network (either the host provider's network or the partner provider's network, as the case may be). The first network may then reconfigure the tracking area such that the identified border sector does not border any other tracking area in the first network. In other words, when the first network reconfigures the tracking area, it will add or remove sectors in such a way so that the identified border sector is not a border sector in the new tracking area. This may also help reduce congestion in that border sector, and each network generally, as well as, perhaps, have other advantages for each network.

An entity of the first network, such as MME 15, may identify that a particular border sector is also a border sector in another network in any number of different ways. For instance, in one embodiment of the method, MME 15 may refer to a stored network map (or other data set) that indicates which shared sectors are border sectors in another network. Alternatively, in another embodiment of the method, MME 15 may transmit a query to an entity of the second network (e.g., another MME), requesting identification of all border sectors in a particular area. In other embodiments, however, other ways of identifying border sectors are used.

Figure 6:
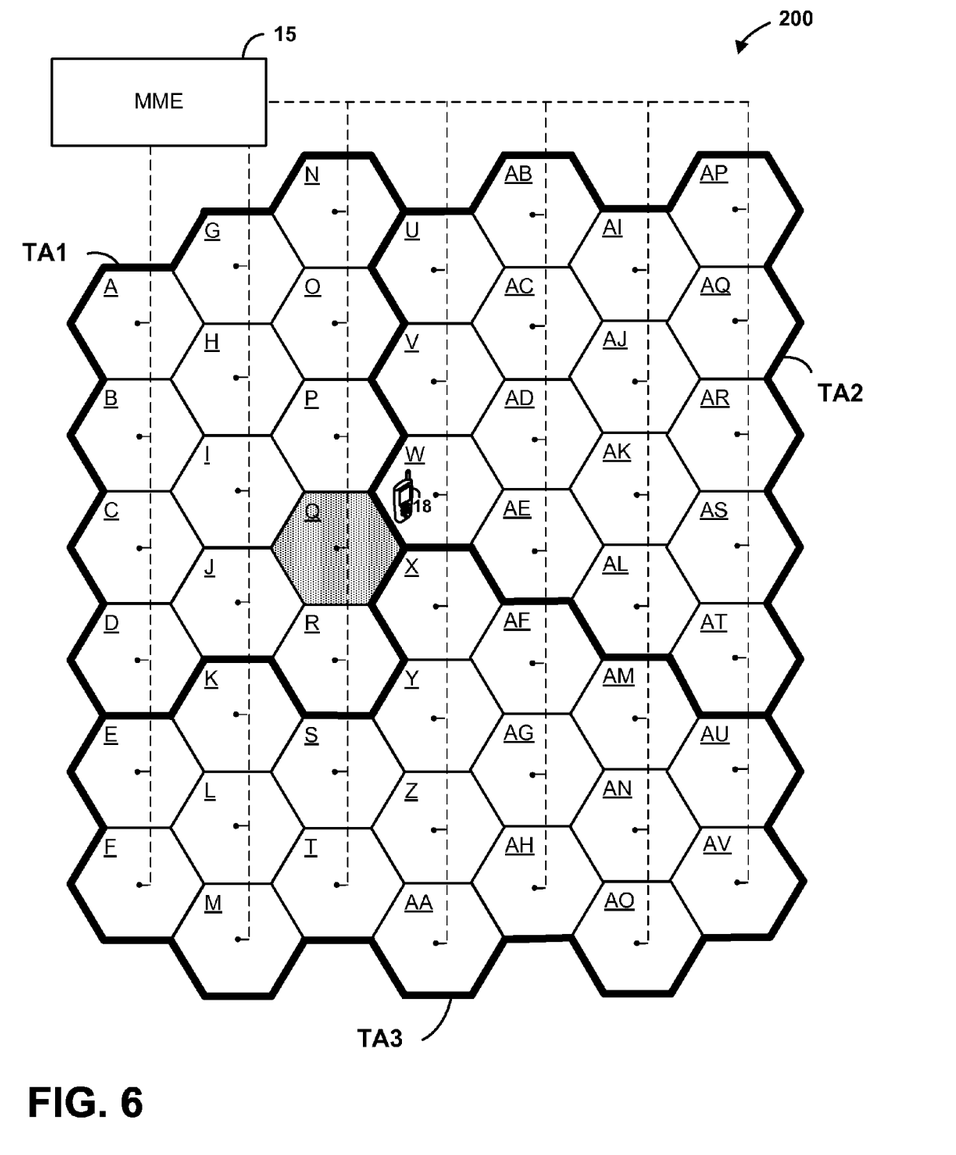
FIG. 6 depicts an example arrangement of tracking areas in which the present methods can be implemented.

FIG. 6 depicts a portion of network 200 in which at least one embodiment of the present methods can be carried out. In accordance with one embodiment, for example, FIG. 6 depicts a scenario in which a RAN entity, such as MME 15, has made a decision to reconfigure tracking area TA1. In response to making that decision, MME 15 may evaluate load at each border sector of TA1: A, B, C, D, G, J, N, O, P, Q, and R. As a result of this evaluation, MME 15 may determine that sector Q has at least a threshold level of load, as depicted by the shading. In response, MME 15 may reconfigure TA1 such that sector Q is not a border sector. In particular, MME 15 may add sectors to TA1 that surround sector Q on all sides.

In accordance with another embodiment, for example, FIG. 6 depicts another scenario in which a RAN entity, such as MME 15, has made a decision to reconfigure a tracking area. In this scenario, however, in response to making that decision, MME 15 may identify that sector Q is also a border sector in another network (such as a partner network), as depicted by the shading. As a result of this identification, MME 15 may reconfigure TA1 such that sector Q is not a border sector. In particular, MME 15 may add sectors to TA1 that surround sector Q on all sides.

Figure 7:
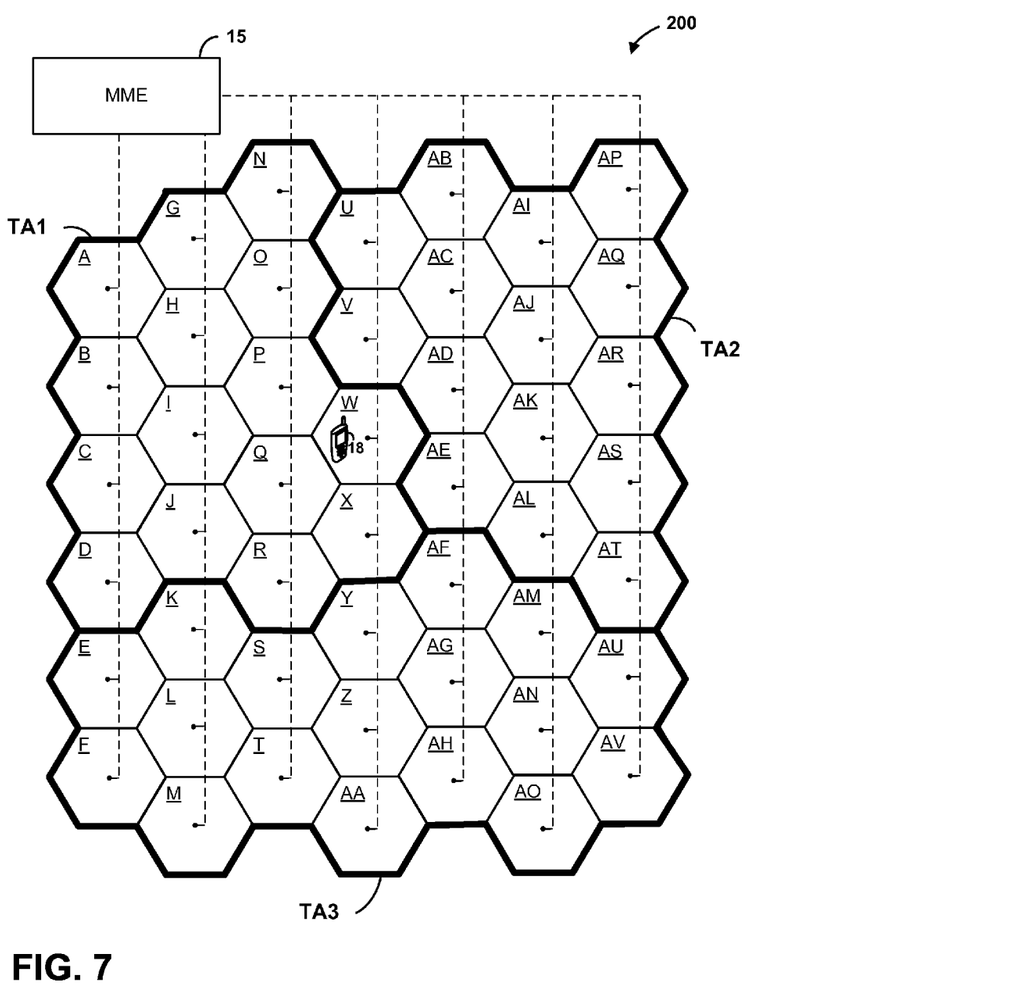
FIG. 7 depicts an example arrangement of tracking areas in which the present methods can be implemented.

FIG. 7, for example, depicts a portion of network 200 in which MME 15 has reconfigured TA1 such that sector Q is not a border sector. Particularly, MME 15 has added sectors W and X from tracking area TA2 to tracking area TA1. As described above, to carry this out MME 15 may send a message to the respective eNBs of sectors W and X instructing them to change their broadcast tracking area IDs from "TA2" and "TA3," respectively, to "TA1" Again, other ways of changing a sector's tracking area are possible as well, as are other ways of reconfiguring a tracking area such that a particular border sector is no longer a border sector.

Figure 8:
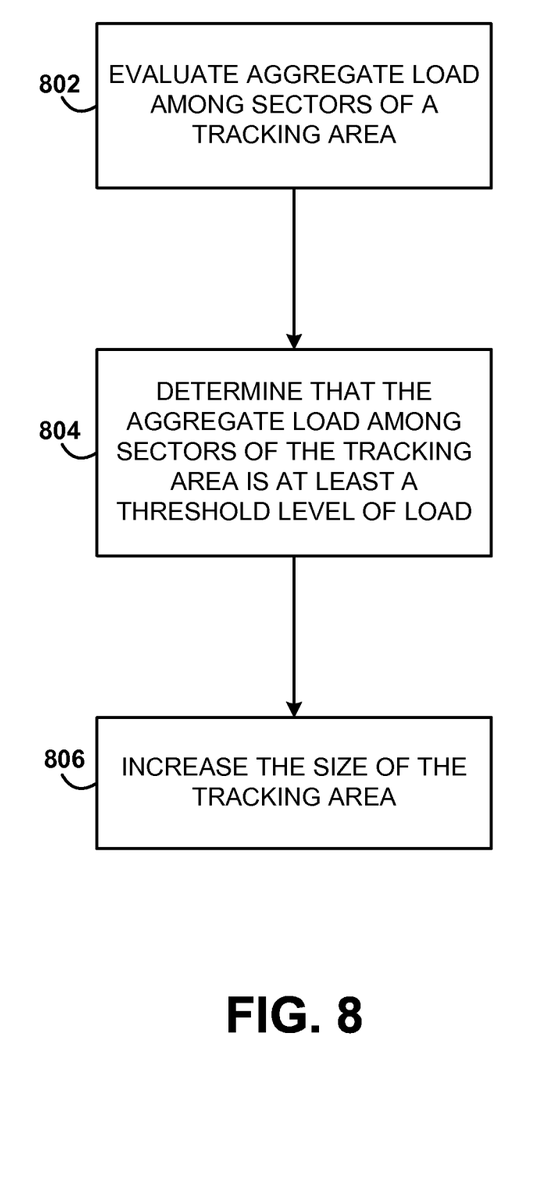
FIG. 8 is a flowchart depicting functions that can be carried out in accordance with the present methods.
Figure 9:
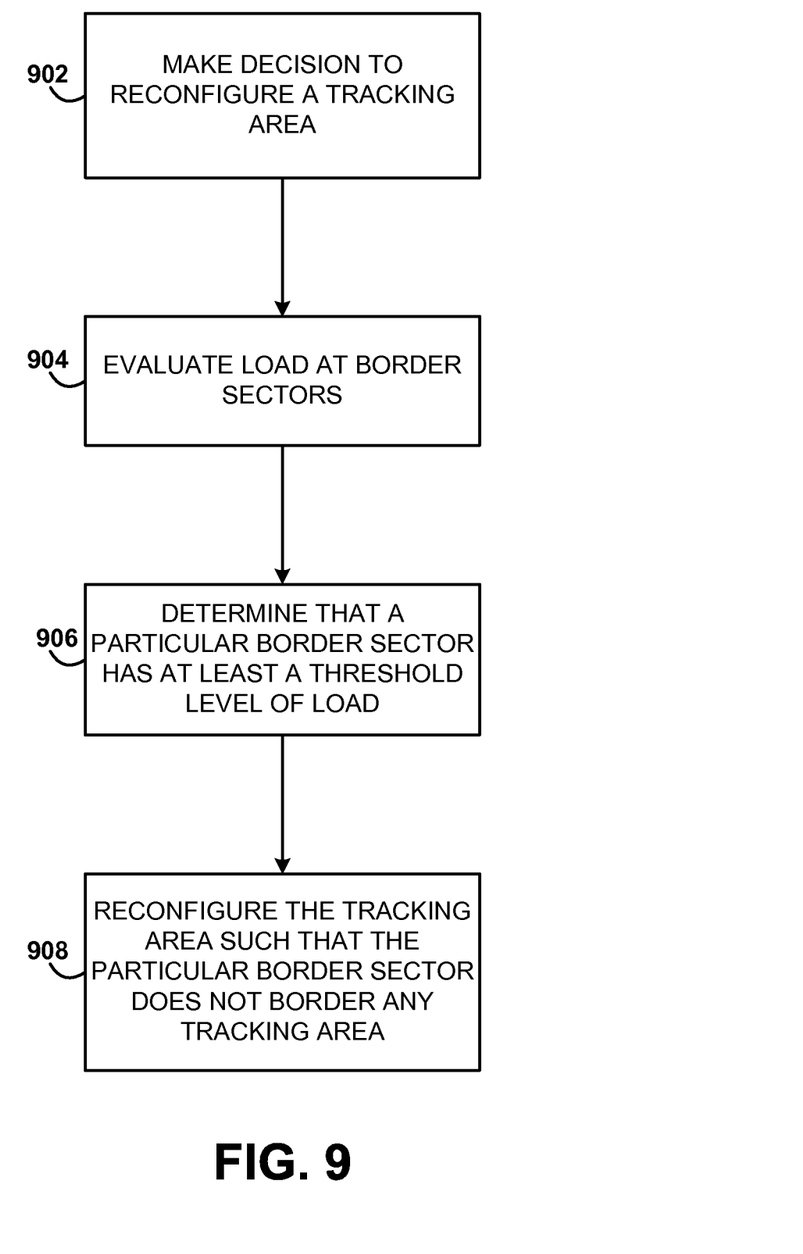
FIG. 9 is a flowchart depicting functions that can be carried out in accordance with the present methods.
Figure 10:
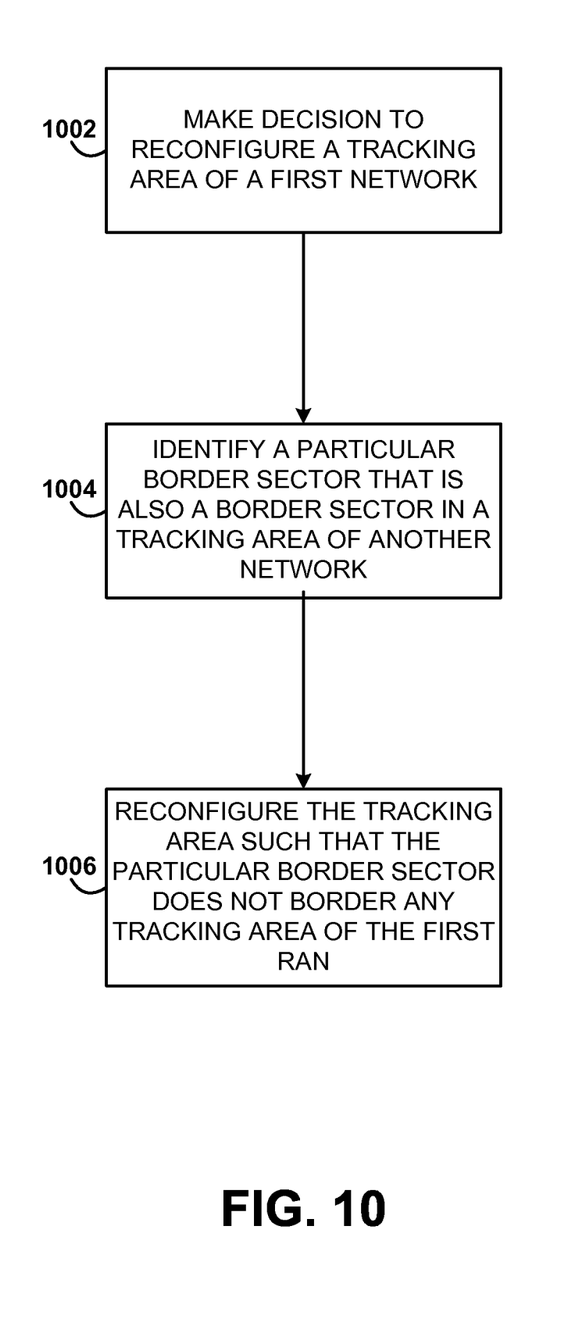
FIG. 10 is a flowchart depicting functions that can be carried out in accordance with the present methods.

FIGS. 8, 9, and 10 are flowcharts depicting functions that can be carried out by a RAN entity (such as an MME), in accordance with at least one embodiment of the description set forth above. The process depicted in FIG. 8, for instance, begins at step 802, where a RAN entity evaluates aggregate load among sectors of a tracking area. For example, as described above, the RAN entity may carry this out by measuring the total reverse link congestion (or just the reverse-link congestion on a particular channel, e.g., the control channel), or the reverse link noise rise, of the tracking area. Alternatively, the RAN entity may measure the rate at which UEs are transmitting tracking area update messages. Other ways of evaluating load are possible as well.

The process continues at block 804, where the RAN entity determines that the aggregate load among sectors of the tracking area is at least a threshold level of load. For example, as described above, the RAN entity may determine that the total reverse link congestion is 80%, or the total reverse link noise rise is 8 db, or UEs are transmitting tracking area update messages at a rate of about 1000 per minute, as the case may be. These thresholds are merely examples, however, and in other embodiments of the process, other thresholds are possible.

The process continues at block 806, where the RAN entity increases the size of at least one tracking area. As described above, a RAN entity may increase the size of a given tracking area by causing some of the eNBs of sectors from another tracking area to join the given tracking area. In one example, an MME carries this out by instructing those eNBs to change their broadcast tracking area IDs from their existing tracking area IDs to the tracking area ID of the given tracking area. Other ways to increase the size of a tracking area are possible as well.

As shown in FIG. 9, the process begins at step 902 where a RAN entity makes a decision to reconfigure a tracking area. The RAN entity may make this decision for any conceivable reason, an example of which may be that the RAN entity has evaluated load among sectors of the tracking area and determined that the load has reached a threshold level of load, as set forth in the process depicted in FIG. 8. However, other reasons are possible as well.

The process continues at block 904 where the RAN entity evaluates load at the border sectors of the tracking area. As described above, the RAN may carry this out by measuring the total reverse link congestion (or just the reverse-link congestion on a particular channel, e.g., the control channel), or the reverse link noise rise, of the border sectors. Alternatively, the RAN entity may measure the rate at which UEs are transmitting tracking area update messages. Other ways of evaluating load are possible as well.

Continuing at block 906, the RAN entity determines that a particular border sector has at least a threshold level of load.

Similar to the threshold determination carried out in block 804, the RAN entity may determine that the total reverse link congestion is 80%, or the total reverse link noise rise is 8 db, or UEs are transmitting tracking area update messages at a rate of about 1000 per minute, as the case may be. Again, these thresholds are merely examples and in other embodiments of the process, other thresholds are possible.

Finally, at block 908, the RAN entity reconfigures the tracking area such that the particular border sector does not border any other tracking area. As described above, a RAN entity may accomplish this by adding to the tracking area sectors from another tracking area such that the particular border sector is surrounded on all sides. In one example, an MME carries this out by instructing certain eNBs to change their broadcast tracking area IDs from their existing tracking area IDs to the tracking area ID of the given tracking area. Other ways to reconfigure a tracking area are possible as well.

As shown in FIG. 10, the process begins at step 1002 where an entity of a first network makes a decision to reconfigure a tracking area. Again, the first-network entity may make this decision for any conceivable reason, an example of which may be that the first-network entity has evaluated load among sectors of the tracking area and determined that the load has reached a threshold level of load, as set forth in the process depicted in FIG. 8. However, other reasons are possible as well.

The process continues at block 1004 where the first-network entity identifies a particular border sector that is also a border sector in a tracking area of another network. As described above, in one embodiment of the process, the first-network entity may refer to a stored network map (or other data set) that indicates which shared sectors are border sectors in another network. Alternatively, in another embodiment of the process, the first-network entity may transmit a query to an entity of the second network, requesting identification of all border sectors in a particular area. In other embodiments, however, other ways of identifying border sectors are used.

Finally, at block 1006, the first-network entity reconfigures the tracking area such that the particular border sector does not border any other tracking area in the first network. As described above, a first-network entity may accomplish this by adding to the tracking area sectors from another tracking area such that the particular border sector is surrounded on all sides. In one example, an MME carries this out by instructing certain eNBs to change their broadcast tracking area IDs from their existing tracking area IDs to the tracking area ID of the given tracking area. Other ways to reconfigure a tracking area are possible as well.

5. Conclusion

Various embodiments have been described above. Those skilled in the art will understand, however, that changes and modifications may be made to these embodiments without departing from the scope of the claims.

We claim:

1. In a wireless communication system in which a plurality of sectors of a radio access network (RAN) are organized into a plurality of tracking areas with each tracking area of the plurality of tracking areas having a respective size and at least one user equipment (UE) operating therein, a method comprising:

evaluating aggregate load among sectors of a given tracking area by a RAN entity;

based on the evaluating, determining that the aggregate load among sectors of the given tracking area is at least a threshold level of aggregate load by the RAN entity; and in response to the determining, increasing the size of the given tracking area by the RAN entity.

2. The method of claim 1, wherein the aggregate load among sectors of the given tracking area comprises reverse-link congestion among sectors of the given tracking area.

3. The method of claim 1, wherein the aggregate load among sectors of the given tracking area comprises reverse-link control-channel congestion among sectors of the given tracking area.

4. The method of claim 1, wherein the aggregate load among sectors of the given tracking area comprises a number of tracking area update messages sent per unit time by UEs operating in the given tracking area.

5. The method of claim 1, wherein each tracking area of the number of tracking areas includes a respective number of sectors, and wherein increasing the size of at least one tracking area comprises increasing the respective number of sectors included in the at least one tracking area.

6. The method of claim 1, wherein each given sector of the plurality of sectors is associated with a respective base station that broadcasts over an air interface a tracking area ID that is indicative of a tracking area in which the given sector is included, and wherein increasing the size of the given tracking area comprises instructing at least one base station associated with a sector to broadcast a different tracking area ID.

7. In a wireless communication system in which a plurality of sectors of a radio access network (RAN) are organized into a plurality of tracking areas, wherein each given tracking area of the plurality of tracking areas includes (i) one or more border sectors that border at least one other tracking area, and (ii) at least one user equipment (UE) operating therein, a method comprising:

making a decision to reconfigure a given tracking area by the RAN entity;

in response to the RAN entity making the decision to reconfigure the given tracking area, evaluating by the RAN entity load at each border sector of the given tracking area;

based on the evaluating, identifying a particular border sector has at least a threshold level of load by the RAN entity; and reconfiguring by the RAN entity of the given tracking area such that the identified border sector does not border any other tracking area.

8. The method of claim 7, wherein the RAN entity making a decision to reconfigure the given tracking area comprises the RAN entity evaluating aggregate load among sectors of the given tracking area and thereby determining that the aggregate load among sectors of the given tracking area is at least a threshold level of load.

9. The method of claim 7, wherein the RAN entity evaluating load at each border sector of the given tracking area comprises the RAN entity evaluating reverse link congestion at each border sector of the given tracking area.

10. The method of claim 7, wherein the RAN entity evaluating load at each border sector of the given tracking area comprises the RAN entity evaluating reverse-link control-channel congestion at each border sector of the given tracking area.

11. The method of claim 7, wherein the RAN entity evaluating load at each border sector of the given tracking area comprises for each given border sector of the given tracking area, the RAN entity measuring a number of tracking area update messages sent per unit time by UEs operating in the given border sector.

12. The method of claim 7, wherein the RAN entity identifying that a particular border sector has at least a threshold level of load comprises the RAN entity identifying, from among each border sector of the given tracking area, a particular border sector that has a highest level of load.

13. The method of claim 7, wherein each tracking area of the number of tracking areas includes a respective number of sectors, and wherein reconfiguring the given tracking area comprises one or more of the following:
   (i) adding at least one sector to the given tracking area, and
   (ii) removing at least one sector from the given tracking area.

14. The method of claim 7, wherein each given sector of the plurality of sectors is associated with a respective base station that broadcasts over an air interface a tracking area ID that is indicative of a tracking area in which the given sector is included, and wherein reconfiguring the given tracking area comprises instructing at least one base station associated with a sector to broadcast a different tracking area ID.

15. In a wireless communication system in which a plurality of sectors are shared by a first radio access network (RAN) and a second RAN, wherein each sector of the plurality of sectors is included in a respective tracking area of the first RAN and a respective tracking area of the second RAN, and wherein each tracking area of the first RAN and each tracking area of the second RAN includes (i) one or more border sectors that border at least one other tracking area, and (ii) at least one user equipment (UE) operating therein, a method comprising:
   making a decision to reconfigure a given tracking area of the first RAN by a RAN entity;
   in response to the RAN entity making the decision to reconfigure the given tracking area of the first RAN, identifying by the RAN entity a particular border sector in the given tracking area that is also a border sector in a tracking area of the second RAN; and
   reconfiguring by the RAN entity of the given tracking area such that the identified border sector does not border any tracking area of the first RAN.

16. The method of claim 15, wherein the RAN entity making a decision to reconfigure the given tracking area of the first RAN comprises the RAN entity evaluating aggregate load among sectors of the given tracking area and thereby determining that the aggregate load among sectors of the given tracking area is at least a threshold level of load.

17. The method of claim 16, wherein the aggregate load among sectors of the given tracking area comprises reverse-link control-channel congestion among sectors of the given tracking area.

18. The method of claim 16, wherein the aggregate load among sectors of the given tracking area comprises a number of tracking area update messages sent per unit time by UEs operating in the given tracking area.

19. The method of claim 15, wherein each tracking area of the first RAN includes a respective number of sectors, and wherein reconfiguring the given tracking area comprises one or more of the following:
   (i) adding at least one sector to the given tracking area, and
   (ii) removing at least one sector from the given tracking area.

20. The method of claim 15, wherein each given sector of the plurality of sectors is associated with a respective base station that broadcasts over an air interface a tracking area ID that is indicative of a tracking area of the first RAN in which the given sector is included, and wherein reconfiguring the given tracking area comprises instructing at least one base station associated with a sector to broadcast a different tracking area ID.

* * * * *